E. H. GRAHAM.

Picker Staff Motion for Looms.

No. 2,367. Reissued Oct. 2, 1866.

Witnesses
A. W. Brown
Frederic A. Payer.

Inventor
Edmund H. Graham
by his Atty
Em Lewis

N. PETERS, Photo-Lithographer, Washington, D. C.

UNITED STATES PATENT OFFICE.

EDMUND H. GRAHAM, OF MANCHESTER, NEW HAMPSHIRE.

IMPROVEMENT IN PICKER-STAFF MOTIONS FOR LOOMS.

Specification forming part of Letters Patent No. 30,441, dated October 16, 1860; Reissue No. 2,367, dated October 2, 1866.

*To all whom it may concern:*

Be it known that I, EDMUND H. GRAHAM, of Manchester, county of Hillsborough, State of New Hampshire, have invented certain new and useful Improvements in Picker-Staff Motions for Looms; and I do hereby declare the following description and accompanying drawings are sufficient to enable any person skilled in the art to which it most nearly appertains to make and use my said invention and improvements without further invention or experiment.

The nature of my invention and improvements consists in steadying and holding the rocker of the picker-staff on its bed by a journal or journals at a right angle to the picker-staff, substantially as described in the following specification, and in making the boxes for the aforesaid journals with open ears.

Figure 3:
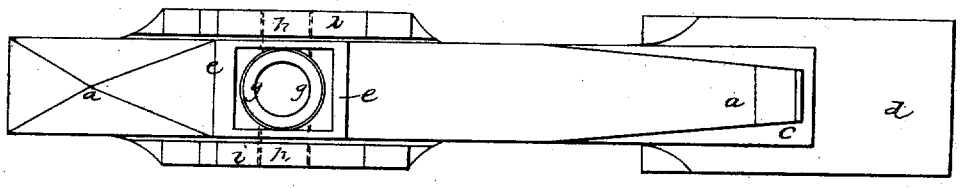
Figure 1:
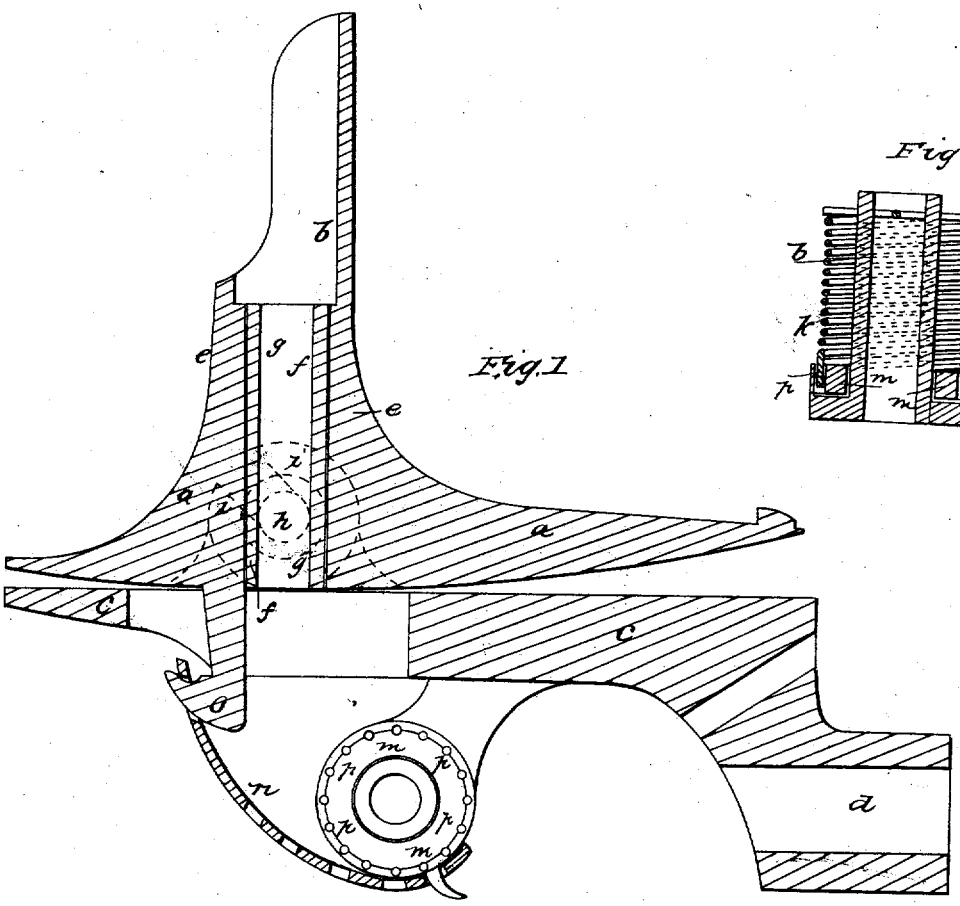
Figure 2:
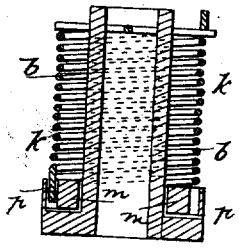

In the above-mentioned drawings, Figure 1 is a sectional elevation representing my invention, cut vertically and centrally lengthwise through Fig. 3. Fig. 2 is a section of the spring and its cylinder. Fig. 3 is a plan or top view of the whole.

In these drawings, *c c* is the rocker-bed, made of cast-iron in the form shown, or in such other form as will answer the purpose, with an end, *d*, having a hole through it, as shown in Fig. 1, for the end of the rock-shaft of the lay of the loom, to which shaft it may be fastened by a set-screw or otherwise.

The top of the bed *c* is horizontal to receive the rocker *a a*, which is arranged to rock on it. This rocker is also made of cast-iron, in the form shown, or in such other form as will answer the purpose, and provided with a standard, *e e*, in the upper end of which there is a socket, *b b*, to receive the lower end of the picker-staff. Below the socket *b* there is a hole, *f f*, entirely through the rocker for the arm *g g* of the rock-shaft, which has journals *h h* working in boxes *i i*, which project up from the sides of the bed on each side of the rocker, as shown by dotted lines in Fig. 1. There is an inclined score cut across the boxes *i i*, into which scores, which form boxes with open ears, the journals *h h* of the rock-shaft are laid, and in which they work as the rocker is rolled in vibrating the picker-staff.

There is an arm extending down from the bed *c*, which arm has a hollow horizontal hub, *l l*, projecting from it. (Shown in section Fig. 2.) Upon the hub *l* there is a coiled spring, *k k*. One end of this spring is stopped by a pin put through the end of the hub, and the other end enters one of the holes in the loose-collar *m m*, which has a hook on its periphery for the strap *n*, which connects the collar and spring to the hook *o* on the under side of the rocker *a*, so that the spring *k* may roll the rocker back, and also the picker-staff after it has thrown the shuttle. The force of the spring *k* may be adjusted by changing the end of the spring to different holes *p p* in the collar *m*. The hook *o* on the under side of the rocker *a* works through a slot in the bed *c*.

Having thus described my improvements, I claim—

1. Steadying the rocker of the picker-staff on its bed by journals at a right angle to the picker-staff, which journals form its center of motion, substantially as described.

2. The journal-boxes with open ears, in combination with the journals that steady the rocker on the bed.

EDMUND H. GRAHAM.

Witnesses:

J. DENNIS, Jr.,

EDM. F. BROWN.